United States Patent [19]

Wolf et al.

[11] B 3,994,835

[45] Nov. 30, 1976

[54] PROCESS FOR THE PRODUCTION OF COLORED POLYURETHANE FOAMS

[75] Inventors: Karlheinz Wolf; Konrad Nonn, both of Leverkusen; Reinhold Hörnle, Cologne; Hans Unterbirker; Jurgen Koerner, both of Opladen, all of Germany

[73] Assignee: Bayer Aktiengesellschaft, Leverkusen, Germany

[22] Filed: Dec. 5, 1973

[21] Appl. No.: 422,063

[44] Published under the second Trial Voluntary Protest Program on February 3, 1976 as document No. B 422,063.

[30] Foreign Application Priority Data

Dec. 5, 1972 Germany............................ 2259435

[52] U.S. Cl............................. 260/2.5 AM; 8/171; 260/2.5 AK
[51] Int. Cl.$^2$ .................. C08G 18/14; C08G 18/30
[58] Field of Search................. 260/2.5 AK, 2.5 AM

[56] References Cited
UNITED STATES PATENTS

| | | | |
|---|---|---|---|
| 3,137,671 | 6/1964 | Bosshard | 260/2.5 AK |
| 3,228,780 | 1/1966 | Grelat | 260/2.5 AK |
| 3,278,486 | 10/1966 | Meek | 260/2.5 AK |

FOREIGN PATENTS OR APPLICATIONS

| | | | |
|---|---|---|---|
| 823,089 | 11/1959 | United Kingdom | 260/2.5 AK |
| 867,235 | 5/1961 | United Kingdom | 260/2.5 AK |

OTHER PUBLICATIONS

"Evaluation of Colorants in One-Shot Urethane Foams", Olin, Bulletin 00–44U–7–65, published 7–65; pp. 1 and 2.

"Pigmentation of Flexible Urethane Foam", ICI Technical Information Bulletin, Urethane PC/U.39, Jan. 17, 1963, 9 pages.

"Daltolite Pigment Pastes for Coloring Flexible Urethane Foam", ICI Technical Inf. Bul., PC/U.53; June 22, 1964, 2 pages.

*Primary Examiner*—C. Warren Ivy
*Attorney, Agent, or Firm*—Plumley and Tyner

[57] ABSTRACT

Dispersions of dyestuffs which contain at least one free amino or hydroxyl group capable of reacting with isocyanates under the conditions of polyaddition and liquids in which the dyes are soluble to an extent less than 2 % are suitable for the production of colored polyurethane foams. The dye dispersions can be added before or during the polyaddition reaction.

8 Claims, No Drawings

PROCESS FOR THE PRODUCTION OF COLORED POLYURETHANE FOAMS

Polyurethane foams are produced by reacting linear or branched higher molecular weight compounds which have at least two functional groups which contain active hydrogen atoms, in particular polyesters and polyethers which contain hydroxyl groups, with polyisocyanates in the presence of water or other blowing agents.

It is known to colour polyurethane foams with pigments but the use of pigments has various disadvantages, as will be seen from German Patent Specification No. 1,028,771. The pigments must be extremely finely divided, for example in a liquid, in order to prevent damage to the pore structure of the foam. Moreover, the intensity of colour obtainable with such finely divided pigments is no longer sufficient for present-day requirements.

Another process for producing coloured polyurethane foams is known in which a solution of an organic dye which contains at least one amino-, carboxyl- or hydroxyl group capable of reacting with isocyanates under conditions of polyaddition is added before or during polyaddition. A disadvantage of this process is that the solvents described for this process fail to satisfy certain requirements in that solvents used in the production of polyurethane foams must not have any deleterious effect on the pore structure of the resulting foam, but on the other hand, they must have sufficient solubilising power for the dyes. Sufficiently high dye concentrations for commercial use are therefore only rarely obtained and, in order to obtain the maximum possible concentration and hence maximum colour intensity, it is necessary to find a special solvent for each dye on the basis of the different solubilities.

It has now been found that these difficulties can be eliminated if dye dispersions which contain one or more dyes each of which contains at least one free amino or hydroxyl group capable of reacting with isocyanates under the conditions of polyaddition and liquids in which the dyes are soluble to an extent of less than 2% are added to the reactants used for production of the polyurethane foam, either before or during the reaction. In the exothermic reaction which takes place, the dyes added to the reaction mixture are substantially dissolved therein and are incorporated in almost molecular distribution in the resulting macromolecules.

The liquids used preferably have a vapour pressure of less than 1 mbar at 20°C.

According to a preferred embodiment of the process, the dispersion is introduced into the mixing chamber of the foaming apparatus through a special dosing device as described in German Patent Specification No. 901,471 to make it possible to colour the polyurethane foam continuously.

In contrast to the process using the known pigment dispersions in which the dye is insoluble in the reaction mixture, the process according to this invention results in much higher colour intensities for the same concentration of dye. A further advantage of using dye dispersions rather than dye solutions, is that the dispersions can contain the dye in a much higher concentration, which also makes it possible for deeper colours to be obtained.

Preparation of the dye dispersions according to the invention is carried out by the usual methods, for example by grinding the mixtures in conventional wet crushing apparatus such as rotor-stator mills, ball mills, kneaders or, most advantageously in high-speed stirrer mills which contain milling balls of about 0.1 – 10 mm in diameter. Suitable stirrer mills have been described, for example, in Farbe und Lack 71, page 377 et seq (1965), in Farbe und Lack 75, page 953 et seq (1969) and in German Auslegeschrift No. 1,230,657. The most suitable stirrer mills are those rotating at circumferential velocities of from 5 to 60 meters per second, preferably from 10 to 20 meters per second and containing grinding elements of preferably 0.3 to 1.2 mm made of steel, glass, ceramics, sand or plastics.

The dye dispersions according to the invention contain 5 – 50% and preferably 10 – 20% of dye.

The dyes which contain amino or hydroxyl groups may belong to various classes of dyes, for example triphenylmethane, oxazine, thiazine, nitro, methine or phthalocyanine or, particularly, azo or anthraquinone dyes.

The reactive amino groups may be primary or secondary. Primary amino groups are preferred. These may be directly attached to an aromatic nucleus of the dye molecule or connected to the dye molecule an alkylene bridge. The alkylene bridge may in turn be connected to the dye group either directly or by a —CO—, $CO_2$—, —$SO_2$—, —CONH—, —NH— or — $SO_2$NH group. The reactive hydroxyl group is preferably part of an oxyalkyl group. This may be directly attached to an aromatic nucleus, for example as an oxymethyl group, or by a bridge atom, for example an oxygen, sulphur or nitrogen bridge, as in the groups —O—$CH_2$—$CH_2$—OH,

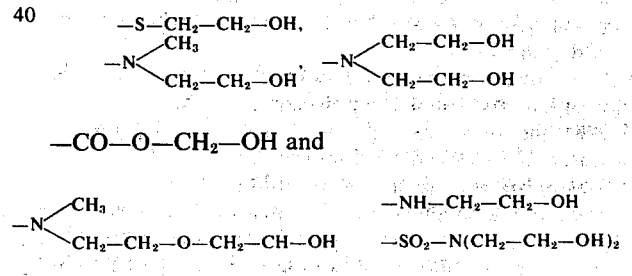

Suitable dyes from various series of dyes have been disclosed in German Auslegeschrift No. 1,114,317.

The liquids used for the dispersion may either be any of the usual plasticizers which remain in the foam and will not react with isocyanates, in particular aryl, alkyl or halogenated alkyl esters of phosphoric acid, adipic acid esters, phthalic acid esters or glyceric esters, or alternatively it is also advantageous to use high-molecular weight liquid polyalcohols, for example condensation products of adipic acid and butane -1,3-diol or propylene-1,2-glycol with a hydroxyl number of 110 – 120, which are built into the polyurethane structure. Tri-n-butyl phosphate, diphenyl-cresyl phosphate, diphenyl-octyl phosphate, butyl-bencyl phthalate, dioctyl phthalate and condensation products of adipic acid and butane-1,3-diol, propylene-1,2-diol or dipropylene glycol with a hydroxyl number of 110 – 120 or mixtures of these compounds are particularly suitable.

EXAMPLE 1

A mixture consisting of 10.0% of the azo of the following formula

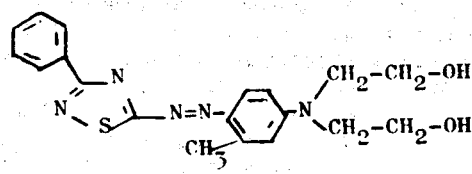

13.5% of butyl benzyl phthalate and 76.5% of a condensation product of adipic acid and propylene-1,2-glycol which has a hydroxyl number of 112 – 113 and acid number of 0.31 is homogenised by stirring and then milled in a continuously operating commercial stirrer mill which contains glass balls 0.3 – 0.4 mm in diameter as grinding elements and in which the shaft equipped with flat circular discs is rotated at the rate of 1000 revs per min until the particle size of the dye is less than 1 – 2μ.

To produce a red polyurethane foam, 0.5% by weight of the dye dispersion are introduced into the mixing chamber of the foaming apparatus according to German Patent Specification No. 901,471 through a separate dosing pump. After vigorous mixing of the reactants (formulations for a polyether foam and for a polyester foam are given in the following pharagraphs), a foam with uniform pore size and uniformly deep red in colour is obtained.

A polyether foam is produced from 100 g of a conventional trifunctional polyether prepared from trimethylol propane, propylene oxide and ethylene oxide (OH-number 35), 4 g of water, 0.8 g of a polysiloxanepolyalkylene block copolymer as stabiliser, 0.12 g of triethylenediamine as catalyst, 0.16 g of tin octoate and the quantity of tolylene diisocyanate which is stoichiometric with respect to the quantity of the polyether and water used.

A polyester foam is produced from the following components: 100 g of a polyester prepared from adipic acid and diethylene glycol (OH-number 50), 4 g of water, 1.4 g of N-methyl morpholine as catalyst, 1.5 g of an emulsifier consisting of an addition product of ethylene oxide with a mixture of higher alcohols and having an average molecular weight of 1100 and OH-number 52, 3.8 g of a sulphonated castor oil, 0.2 g of paraffin oil and the quantity of tolylene diisocyanate corresponding to the stoichiometric quantity of the polyester and water used.

EXAMPLE 2

The following dye components are used in the way described in example 1:

a) 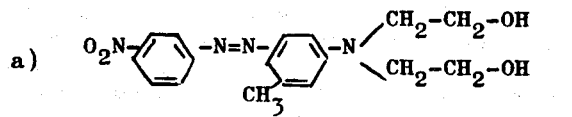

b) 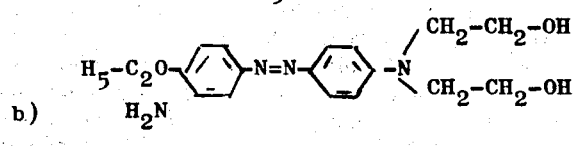

EXAMPLE 3

A dye dispersion is prepared as described in example 1, but butyl benzyl phthalate is replaced by tri-n-butyl phosphate.

EXAMPLE 4

Dye dispersions are prepared as described in example 1, but the addition product of adipic acid and propylene glycol is replaced by a polydipropylene glycol adipate with OH-number 110 - 111 and acid number 0.2 or by a condensation product of adipic acid and butane-1,3-diol with OH-number 114 and acid number 0.36.

We claim:

1. In a process for producing a colored polyurethane foam wherein a polyether or a polyester is reacted with an organic polyisocyanate to produce a polyurethane foam, the improvement which comprises adding to the reactants of the polyurethane foam production before or during the reaction a dispersion of one or more dyes each of which contains at least one free amino or hydroxyl group capable of reaction with isocyanates under the conditions of polyaddition and liquids in which the dyes are soluble to an extent of less than 2% at 20°C.

2. The process of claim 1 wherein said dispersion is a mixture of 5%-50% by weight of dye and the remainder a liquid compatible with the foam producing reactants, capable of dissolving no more than 2% of said dye and having a vapor pressure at 20°C of less than 1 mbar.

3. The process of claim 2 wherein said liquid is a plasticizer which will remain the foam and will not react with the isocyanates or said liquid is a high molecular weight polyalcohol.

4. The process of claim 3 wherein said liquid is tri-n-butyl phosphate, diphenylcresyl phosphate, diphenyloctyl phosphate, butylbenzyl phthalate, dioctyl phthalate, condensation product of adipic acid with butane-1,3-diol, propylene-1,2-diol or dipropylene glycol having an hydroxyl number of 110 – 120, or mixtures thereof.

5. The process of claim 1 wherein said amino group is primary amino or secondary amino and is attached to an aromatic nucleus of the dye (a) by a direct bond, (b) via an alkylene bridge, or (c) via an alkylene bridge separated from said nucleus by —CO—, —CO₂—, —SO₂—, —CONH—, —NH—, or —SO₂NH—.

6. The process of claim 1 wherein said hydroxyl is attached to an aromatic nucleus of the dye (a) by a direct bond, (b) via an alkylene bridge, or (c) via an alkylene bridge separated from said nucleus by an oxygen, sulfur, or nitrogen.

7. The process of claim 3 wherein said liquid plasticizer is an aryl ester of phosphoric acid, alkyl ester of phosphoric acid, halogenated alkyl ester of phosphoric acid, adipic acid ester, phthalic acid ester or glyceric ester.

8. The process of claim 6 wherein said liquid high molecular weight polyalcohol is a condensation product of adipic acid and butane-1,3-diol or propylene-1,2-glycol with a hydroxyl number of 110 – 120.

* * * * *